United States Patent

Taicher et al.

Patent Number: 5,959,453
Date of Patent: Sep. 28, 1999

[54] RADIAL NMR WELL LOGGING APPARATUS AND METHOD

[75] Inventors: Gersch Zvi Taicher; Arcady Reiderman, both of Houston, Tex.

[73] Assignee: Western Atlas International, Inc., Houston, Tex.

[21] Appl. No.: 08/959,770

[22] Filed: Oct. 29, 1997

[51] Int. Cl.[6] ............................................ G01V 3/00
[52] U.S. Cl. .................... 324/303; 324/303; 324/309; 324/318; 324/322; 324/307; 600/410; 600/419; 600/422
[58] Field of Search .................... 324/303, 309, 324/318, 322, 307; 600/410, 419, 422

[56] References Cited

U.S. PATENT DOCUMENTS

| | | | |
|---|---|---|---|
| 4,717,876 | 1/1988 | Masi et al. | 324/303 |
| 5,055,787 | 10/1991 | Kleinberg et al. | 324/300 |
| 5,332,967 | 7/1994 | Shporer | 324/303 |

*Primary Examiner*—John Barlow
*Assistant Examiner*—Brij B. Shrivastav
*Attorney, Agent, or Firm*—Richard A. Fagin

[57] ABSTRACT

A nuclear magnetic resonance sensing apparatus, including a magnet for inducing a static magnetic field within materials to be analyzed. The magnetic field is substantially coaxial with a longitudinal axis of the apparatus. The magnetic field is polarized substantially perpendicularly to the longitudinal axis and is symmetric about the axis. The static magnetic field has a maximum longitudinal gradient which is inversely related to a speed of motion of the apparatus along the longitudinal axis through the materials to be analyzed. The apparatus includes a transmitter for generating a radio frequency magnetic field in the materials for exciting nuclei in the materials. The radio frequency magnetic field is substantially orthogonal to the static magnetic field. The apparatus includes a receiver for detecting nuclear magnetic resonance signals from the excited nuclei in the materials. In a preferred embodiment, the magnet comprise magnetized cylinders stacked along the longitudinal axis. The magnetization of each of cylinder is proportional to its distance from a center plane of the magnet. The cylinders are magnetized parallel to the longitudinal axis and towards the center plane. The preferred embodiment of the magnet includes an end magnet disposed at each longitudinal end of the stacked cylinders. The end magnets are each magnetized parallel to the longitudinal axis and in a direction opposite to the magnetization of an adjacent one of the cylinders.

14 Claims, 10 Drawing Sheets

RADIAL NMR WELL LOGGING APPARATUS AND METHOD

BACKGROUND OF THE INVENTION

1. Field of the Invention

The invention is related to the field of nuclear magnetic resonance ("NMR") sensing apparatus and measuring techniques. More specifically, the invention is related to NMR well logging apparatus and measuring techniques for sensing within earth formations penetrated by a wellbore. The invention also relates to methods for using NMR measurements to determine properties of the earth formations.

2. Description of the Related Art

NMR well logging instruments can be used for determining properties of earth formations, including the fractional volume of pore space ("porosity"), the fractional volume of mobile fluid filling the pore spaces of the earth formations and other petrophysical parameters. Examples of methods and measurement techniques for using NMR measurements for determining the fractional volume of pore space, the fractional volume of mobile fluid and other petrophysical parameters are described in, *Spin Echo Magnetic Resonance Logging: Porosity and Free Fluid Index Determination*, M. N. Miller et al, Society of Petroleum Engineers paper no. 20561, Richardson, Tex. (1990) and in, *Field Test of an Experimental Pulsed Nuclear Magnetism Tool*, C. E. Morriss et al, SPWLA Logging Symposium Transactions, paper GGG (1993).

NMR well logging instruments typically include a permanent magnet to induce a static magnetic field within the earth formations and include a transmitting antenna positioned near the magnet and shaped so that a pulse of radio frequency ("RF") power conducted through the antenna induces an RF magnetic field in the earth formations. The RF magnetic field is generally orthogonal to the static magnetic field. After an RF pulse, voltages are induced in a receiving antenna on the logging instrument by precessional rotation of spin axes of hydrogen or other nuclei about the static magnetic field. The receiving antenna is typically connected to a receiver circuit in the instrument which detects and measures the induced voltages. In a typical NMR measurement set a sequence of RF pulses is applied to the transmitting antenna and a sequence of voltages is measured by the receiving antenna (note that some instruments use the same antenna for transmitting and receiving). The magnitude of the detected voltages and the rates at which the detected voltages vary with time are related to certain petrophysical properties of the earth formation.

One type of NMR well logging apparatus is described, for example, in U.S. Pat. No. 3,597,681 issued to Huckbay et al. The apparatus disclosed in the Huckbay et al '681 patent has several drawbacks, one of which is that a region of unidirectional static magnetic field is not homogeneous along the wellbore axis. As a practical matter, well logging instruments typically must be able to move axially through the wellbore while making measurements. During the time needed to make a typical NMR measurement, the "sensitive volume" (that part of the formation in which nuclear magnetic resonance is excited) generated by the logging instrument will be moved through the wellbore so that the measurement set cannot be completed. Another drawback to the apparatus disclosed in the Huckbay et al '681 patent is that a significant part of the NMR signals originate from within the fluid filling the wellbore (called "drilling mud"). Yet another drawback to the apparatus disclosed in the Huckbay et al '681 patent is that its antenna is directed to one side of the apparatus and therefore uses only a small fraction of the total volume of unidirectional static magnetic field. This results in an inefficient use of the permanent magnet in the instrument.

Still another drawback to the apparatus disclosed in the Huckbay et al '681 patent is that the antenna is subject to a high static magnetic field strength and, therefore, can have an unacceptably high amount of magnetoacoustic ringing.

Another drawback to the apparatus disclosed in the Huckbay et al '681 patent is that the RF magnetic field generated by the antenna drops in magnitude as the third power of the distance from the instrument to the sensitive volume since the antenna in this instrument is the equivalent of a three dimensional magnetic dipole. Such an antenna is proximally coupled only to a small part of the unidirectional static magnetic field. This results in an extremely low signal-to-noise ratio.

Another type of NMR well logging instrument is described in U.S. Pat. No. 4,350,955 issued to Jackson et al. The instrument disclosed in the Jackson et al '955 patent includes permanent magnets configured to induce a magnetic field in the earth formations which has a toroidal volume of substantially uniform magnetic field strength. A particular drawback to the apparatus disclosed in the Jackson et al '955 patent is that the thickness of the toroidal volume is very small relative to typical rates of axial motion of well logging tools during measurement operations. Well logging instruments, in order to be commercially useful, typically must be able to move axially through the wellbore at rates not less than about ten feet per minute. The length of time needed to make a typical NMR spin-echo measurement set can be as long as several seconds. The NMR logging instrument is therefore likely to move a substantial distance during a measurement cycle. Measurements made by the instrument disclosed in the Jackson et al '955 patent are therefore subject to error as the instrument is moved during logging operations, because the antenna would no longer be positioned so as to be sensitive to the same toroidal volume which was magnetized at the beginning of any measurement set.

Another drawback to the apparatus instrument in the Jackson et al '955 patent is that it does not eliminate NMR signals originating within the fluid filling the wellbore.

A still further drawback to the apparatus disclosed in the Jackson et al '955 patent is that the toroidally shaped static magnetic field is can change in amplitude as the instrument is subjected to changes in ambient temperature and variances in the earth's magnetic field. The antenna in the Jackson et al '955 apparatus is tuned to a single frequency. If the field strength of the static magnetic field in the toroidal volume changes, the antenna may no longer be sensitive to NMR signals originating within the toroidal volume. Using the apparatus in Jackson et al '955, it is impractical to compensate the frequency of the RF magnetic field for changes in the static magnetic field strength within the toroidal volume.

Additional drawbacks to the apparatus disclosed in the Jackson et al '955 patent include the magnet pole pieces being opposed each other. This results in a significant demagnetizing effect which requires magnet material having a high coercive force. This requirement is in directly opposed to the requirement for strong residual magnetization and high temperature stability of the permanent magnet. Second, the magnet pole pieces are spaced apart and are far away from the toroidal region, which makes the use of the permanent magnet material less efficient. Third, the antenna used in the Jackson '955 apparatus has low efficiency as a result of low electromagnetic coupling between the antenna and the earth formation at the resonant frequency for NMR experimentation. Fourth, the antenna is located in a relatively strong static magnetic field, which stimulates magnetoacoustic ringing in the antenna. Fifth, for an NMR measurement technique which uses a homogeneous static magnetic field, changes in the relative position of the instrument with respect to the earth's magnetic field can cause a significant disturbance to the homogeneity of the toroidal region.

Another type of NMR well logging apparatus is described in U.S. Pat. No. 4,717,876 issued to Masi et al. The apparatus disclosed in the Masi et al '876 patent has improved homogeneity in the toroidal region as compared to the apparatus described in the Jackson et al '955 patent, but has basically the same drawbacks as the Jacskon et al '955 apparatus.

Another type of NMR well logging apparatus is described in U.S. Pat. No. 4,629,986 issued to Clow et al. This apparatus provides improved signal-to-noise ratio compared with the apparatus of Jackson et al '955 by including a high magnetic permeability ferrite in the antenna. Increased stability is achieved by performing the NMR measurements in a static magnetic field which includes an amplitude gradient. However, the apparatus disclosed in the Clow et al '986 patent has several drawbacks. Since the magnetic properties of most permanent magnet materials are temperature dependent, the sensitive volume is not stable in shape and magnetic field intensity. The sensitive volume of this instrument is only a couple of inches long in the longitudinal direction, which requires that this instrument be practically stationary during an NMR measurement cycle. The magnet pole pieces are substantially spaced apart and are far from the sensitive region, which makes the use of the permanent magnet material inefficient. The antenna is located in a relatively strong magnetic field, which stimulates magnetoacoustic ringing in the antenna. The high magnetic permeability ferrite in the antenna is located in a relatively strong magnetic field, which may saturate the ferrite and reduce its efficiency. Soft ferrite disposed in a static magnetic field is also a strong source of magnetostrictive ringing following any RF pulse through the antenna. In the magnet arrangement of the Clow et al '986 patent, the demagnetizing field is relatively strong, which requires a magnet material having high coercive force. This requirement is opposite to the strong residual magnetization and high temperature stability of the magnetic properties also required of the permanent magnet material. Finally, the static magnetic field in the earth formations in the sensitive volume is only about 10 Gauss and rotates 360° in a plane perpendicular to the wellbore axis. For this amplitude of static magnetic field, the earth's magnetic field amplitude of about 0.5 Gauss presents a significant disturbance to the overall field strength.

Another type of NMR well logging apparatus described in U.S. Pat. No. 4,717,878 issued to Taicher et al provides azimuthal resolution with respect to the wellbore axis and reduction of spurious signals from the wellbore fluid. However, the apparatus disclosed in the Taicher et al '878 patent has several drawbacks. Since the magnetic properties of the permanent magnet material used in this apparatus are temperature dependent, the sensitive region does not have a stable in shape or stable magnetic field intensity. The antenna is located within a relatively strong magnetic field, which stimulates magnetoacoustic ringing in the antenna. In the arrangement of the magnet in the apparatus disclosed in the Taicher et al '878 patent, the demagnetizing field is very strong, which requires a magnet material having high coercive force. This requirement is directly opposite to the strong residual magnetization and high temperature stability of magnetic properties required of the permanent magnet for a well logging apparatus.

Due to the disadvantages of the foregoing NMR well logging instrument designs, none of them are generally commercially accepted well logging instruments. Commercially accepted well logging instruments include one which is described in U.S. Pat. No. 4,710,713 issued to Taicher et al. The instrument disclosed in the Taicher et al '713 patent includes a generally cylindrical permanent magnet assembly which induces a static magnetic field having substantially uniform magnetic field strength within an annular cylindrical volume in the earth formations. The instrument disclosed in the Taicher et al '713 patent has several drawbacks, however. First, the antenna induces an RF magnetic field within the earth formations surrounding the tool which decreases in strength as the square of the radial distance from the magnet. Because the signal-to-noise ratio of NMR measurements made within a gradient magnetic field is typically related to the strength of the RF magnetic field, the apparatus disclosed in the Taicher et al '713 has very high power requirements, and can have difficulty obtaining measurements having sufficient signal-to-noise ratio at substantial radial distances from the instrument.

Another drawback to the instrument of the Taicher et al '713 patent is that the optimum design of the magnet and the RF antenna, for purposes of optimizg the signal-to-noise ratio, requires that nuclear magnetic resonance conditions be met at a relatively high frequency. Since the RF energy losses in the electrically conductive fluid in the wellbore are proportional to the square of the frequency, the operation of the Taicher et al '713 patent is restricted to use in relatively low conductivity fluids in the wellbore.

Yet another drawback to the apparatus of the Taicher et al '713 patent is that the antenna is located within a relatively strong static magnetic field which is perpendicular to a direction of RF current flow in the transmitting antenna and, therefore, stimulates magnetoacoustic ringing in the transmitting antenna.

Another NMR logging instrument is described in U.S. Pat. No. 5,055,787 issued to Kleinberg et al. This logging instrument includes permanent magnets arranged to induce a magnetic field in the earth formation having substantially zero field gradient within a predetermined sensitive volume. The magnets are arranged in a portion of the tool housing which is typically placed in contact with the wall of the wellbore. The antenna in this instrument is positioned in a recess located external to the tool housing, enabling the tool housing to be constructed of high strength material such as steel. A drawback to the logging instrument in the Kleinberg et al '787 patent is that its sensitive volume is only about 0.8 cm away from the tool surface and extends only to about 2.5 cm radially outward from the tool surface. Measurements made by this instrument are therefore subject to large error caused by, among other things, roughness in the wall of the wellbore, by deposits of the solid phase of the drilling mud (called "mudcake") onto the wall of the wellbore in any substantial thickness, and by the fluid content of the formation in the invaded zone.

Another drawback to the instrument disclosed in the Kleinberg et al '787 patent relates to the permanent magnet material. Since the magnet pole pieces are opposed each other, there is a strong demagnetizing effect which requires a permanent magnet material having high coercive force. This requirement is opposite to the strong residual magnetization and high temperature stability of magnetic properties required of the permanent magnet.

Another NMR measurement apparatus which may have application for well logging is disclosed in U.S. Pat. No. 5,572,132 issued to Pulyer et al. This apparatus includes a permanent magnet for inducing a magnetic field polarized along the longitudinal axis of the apparatus, and antenna coils disposed about the exterior of the magnet. The apparatus described in the Pulyer et al '132 patent, as do most prior art NMR well logging instruments, has a common drawback which is explained, for example, in U.S. Pat. No. 5,332,967 issued to Shporer. This drawback is related to a significant phase shift of the NMR signal, which leads to significant distortion of the NMR signal height and may even lead to a complete disappearance of the NMR signal, when the logging apparatus is moving in a direction along a static magnetic field amplitude gradient. In actual well logging practice, the phase shift and signal reduction may be even worse than is suggested by the Shporer '967 patent because the logging speed can be variable, as is understood by those skilled in the art of well logging.

SUMMARY OF THE INVENTION

The invention is a nuclear magnetic resonance sensing apparatus, including a magnet for inducing a substantially radially symmetrical static magnetic field within materials to be analyzed. The static magnetic field is substantially coaxial with a longitudinal axis of the apparatus and is polarized substantially perpendicularly to the longitudinal axis. The static magnetic field has a maximum longitudinal amplitude gradient which is inversely related to a speed of motion of the apparatus along the longitudinal axis through the materials to be analyzed. The apparatus includes a transmitter for generating a radio frequency magnetic field in the materials for exciting nuclei in the materials. The radio frequency magnetic field is substantially orthogonal to the static magnetic field. The apparatus includes a receiver for detecting nuclear magnetic resonance signals from the excited nuclei in the materials.

In a preferred embodiment of the invention, the magnet includes magnetized cylinders stacked along the longitudinal axis. The magnetization of each one of the cylinders is proportional to its distance from a center plane of the magnet. The cylinders are magnetized parallel to the longitudinal axis and towards the center plane. The preferred embodiment of the magnet includes an end magnet disposed at each longitudinal end of the stacked cylinders. The end magnets are each magnetized parallel to the longitudinal axis, and in a direction opposite to the magnetization of an adjacent one of the cylinders. The preferred embodiment of the magnet includes a hole in the center of the stack of cylinders. An antenna which can be connected to the transmitter and/or receiver can be located in the hole to reduce magnetostrictive ringing in the antenna.

DESCRIPTION OF THE PREFERRED EMBODIMENT

1. Configuration of the Apparatus

Figure 1:
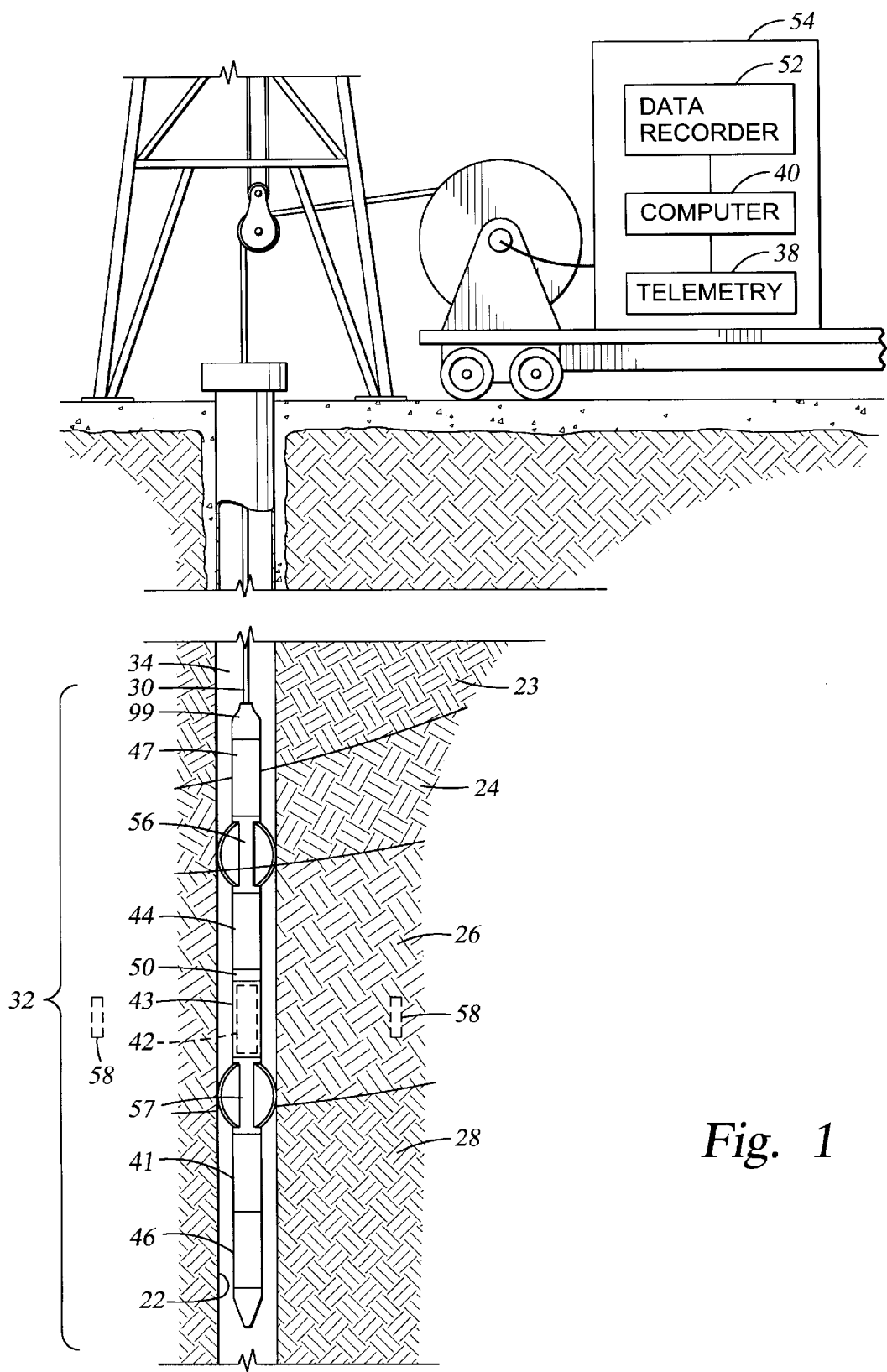
FIG. 1 shows a nuclear magnetic resonance (NMR) well logging apparatus disposed in a wellbore penetrating earth formations.

FIG. 1 shows a nuclear magnetic resonance ("NMR") well logging instrument disposed in a wellbore 22 penetrating earth formations 23, 24, 26, 28 for making measurements of properties of the earth formations 23, 24, 26, 28. The wellbore 22 in FIG. 1 is typically filled with a fluid 34 known in the art as "drilling mud". A "sensitive volume", shown generally at 58 and having generally cylindrical shape, is disposed in one of the earth formations, shown at 26. The sensitive volume 58 is a predetermined portion of the earth formations 26 in which NMR measurements are made by the logging instrument, as will be further explained.

A string of logging tools 32 ("tool string"), which can include the NMR apparatus according to the invention, is typically lowered into the wellbore 22 by a means of an armored electrical cable 30. The cable 30 can be extended into and withdrawn from the wellbore 22 by means of a winch or drum 48 as is known in the art. The tool string 32 can be electrically connected to surface equipment 54 by an insulated electrical conductor (not shown separately in FIG. 1) forming part of the electrical cable 30. The surface equipment 54 can include one part of a telemetry system 38 for communicating control signals and data between the tool string 32 and a computer 40. The computer 40 can also include a data recorder 52 for recording measurements made by the instrument and transmitted to the surface equipment 54 over the logging cable 30.

An NMR probe 42 according to the invention can be included in the tool string 32. The tool string 32 is preferably centered within the wellbore 22 by means of a top centralizer 56 and a bottom centralizer 57 attached to the tool string 32 at axially spaced apart locations. The centralizers 56, 57 can be of any type known in the art such as bowsprings or power operated arms or the like.

Circuitry for operating the NMR probe 42 can be located within an NMR electronics cartridge 44. The circuitry (not shown in FIG. 1) can be connected to the NMR probe 42 through a connector 50. The NMR probe 42 is typically located within a protective housing 43 which is designed to exclude the drilling mud 34 from the interior of the probe 42. The functions of the probe 42 will be further explained.

Other types of well logging sensors (not shown separately for clarity of the illustration in FIG. 1) may form part of the tool string 32. As shown in FIG. 1, one additional logging sensor 47 may be located above the NMR electronics cartridge 44. Additional logging sensors, such as shown at 41 and 46 may be located within or below the bottom centralizer 57. The other sensors 41, 46, 47 can be of types familiar to those skilled in the art and can include, but are not limited to, gamma ray detectors, formation bulk density sensors or neutron porosity detectors. Alternatively, parts of the NMR electronics may be located within electronic cartridges which form part of other logging sensors. The locations of the other sensors 41, 46, 47 shown in FIG. 1 are a matter of convenience for the system designer and are not to be construed as a limitation on the invention.

Figure 2:
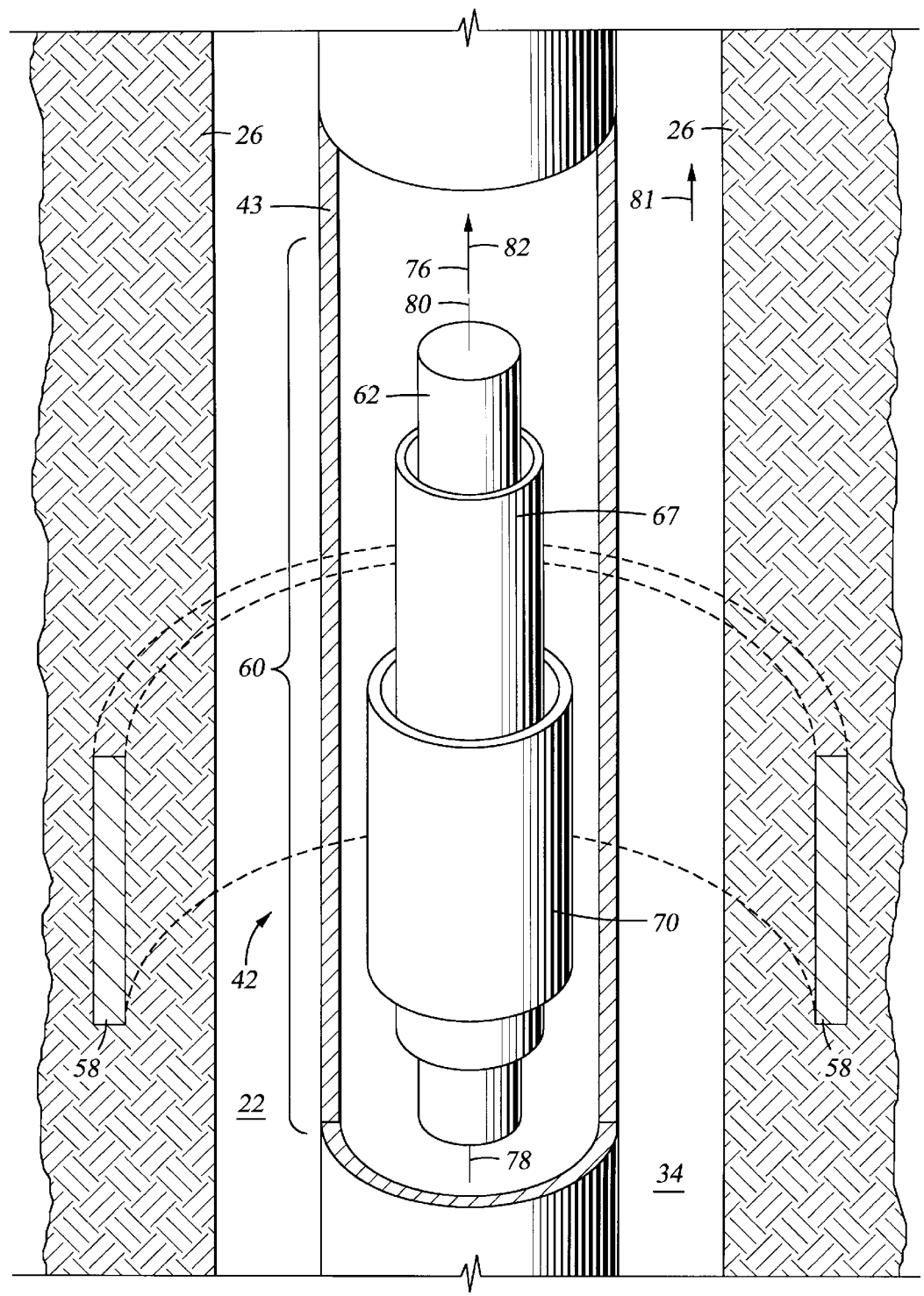
FIG. 2 shows the NMR probe of the apparatus of FIG. 1 in more detail.

FIG. 2 shows the NMR probe 42 in more detail. The NMR probe 42 preferably comprises a generally cylindrical, permanent magnet assembly 60. The magnet assembly 60 includes at least one permanent magnet 62, which is generally elongated along a magnet axis 80 and preferably has a substantially circular cross section perpendicular to the magnet axis 80. The magnet axis 80 is preferably substantially coaxial with an axis 76 of the wellbore (22 in FIG. 1), which location is provided by the upper and lower centralizers (56 and 57 in FIG. 1). The preferred construction of the magnet assembly 60 will be explained in more detail. For clarity of the description, the one or more permanent magnets 62 will be considered together and referred to as the permanent magnet 62, and their common axis 80 and the collocated axis of the wellbore 76 will be jointly identified as a the longitudinal axis, shown at 78.

In a preferred embodiment of the invention the permanent magnet 62 comprises a main magnet 61 and two inserts, a top insert magnet 63 and a bottom insert magnet 64. The main magnet 61, the top insert magnet 63 and the bottom insert 64 have magnetization directions substantially parallel to the longitudinal axis 78. The main magnet 61 is in a form of a annular cylinder having a cylindrical hole 83 substantially through its center, wherein the top insert magnet 63 and the bottom insert 64 are located. The main magnet 61 has substantially homogeneous magnetic charge along the longitudinal axis 78. To have this characteristic, the main magnet 61 can be made up of thin magnetic rings each having a different residual magnetization, in order to approximate substantially linear magnetization distribution from one end of the main magnet 61 to another.

Figure 4:
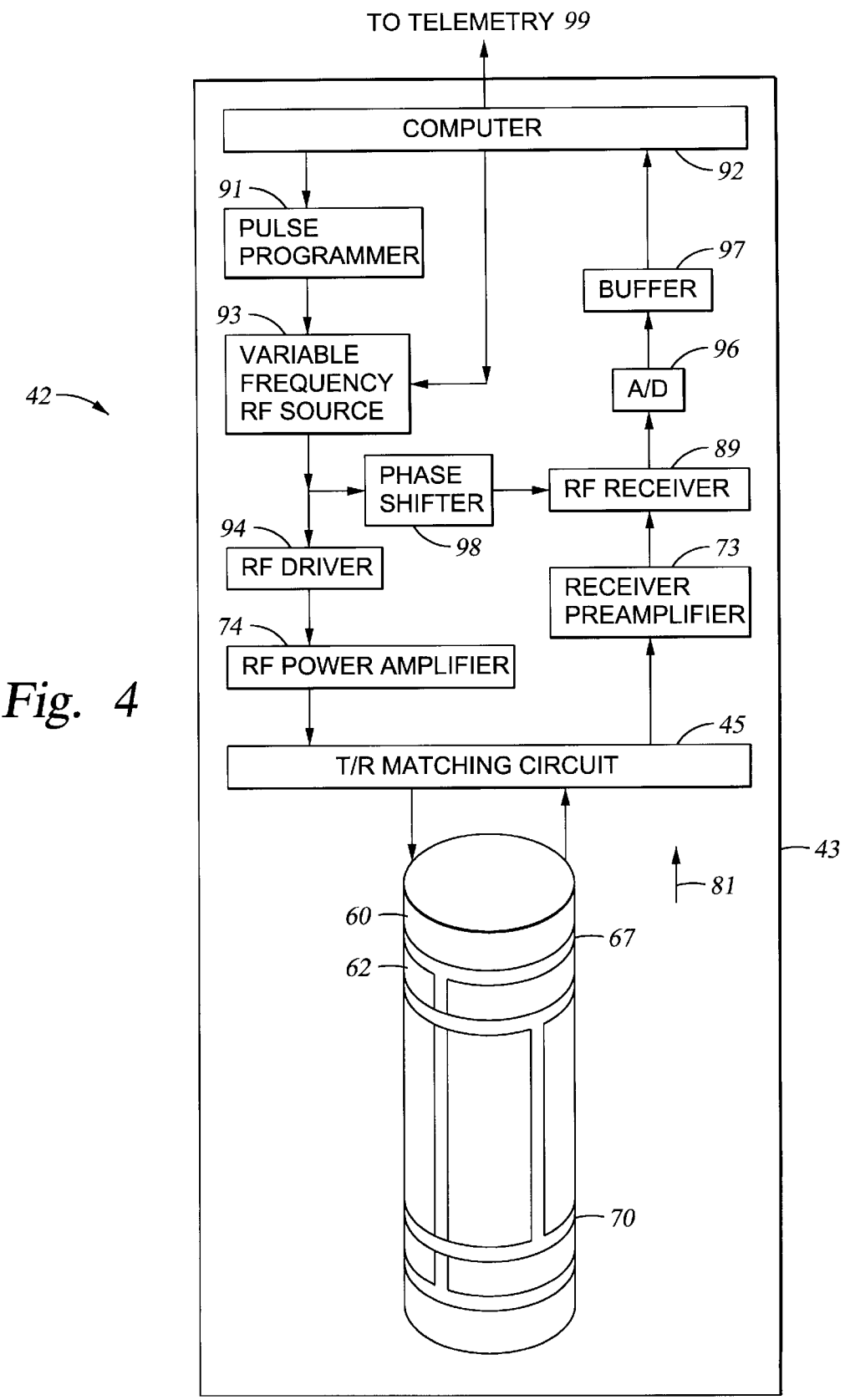
FIG. 4 shows the main magnet assembly of the NMR apparatus in more detail.

The construction of the main magnet 61 is shown in more detail in FIG. 4, which is a side view of the main magnet 61. The main magnet 61 can be composed of a series of axially magnetized cylinders, shown generally as 61A–61F. The magnetization direction of each cylinder 61A–61F is indicated by an arrow on each cylinder 61A–61F. A particular feature of the axially magnetized cylinders 61A–61F is that the magnetization of each cylinder 61A–61F is proportional in magnitude to its axial distance from a center plane 61P of the magnet 61, and the magnetization is directed toward the center plane 61P. The center plane 61P is perpendicular to the longitudinal axis 78 and bisects the main magnet 61 into two substantially equal length sections. For example, uppermost cylinder 61A is shown as having a large magnetization directed downwardly towards the center plain 61P. Correspondingly opposite is lowermost cylinder 61F which has substantially equal strength magnetization as does the uppermost cylinder 61A but its magnetization is directed upwardly towards the center plane 61P. Successively more weakly magnetized opposing pairs of cylinders, such as 61B/61E and 61C/61D are disposed successively closer to the center plane 61P.

Figure 5:
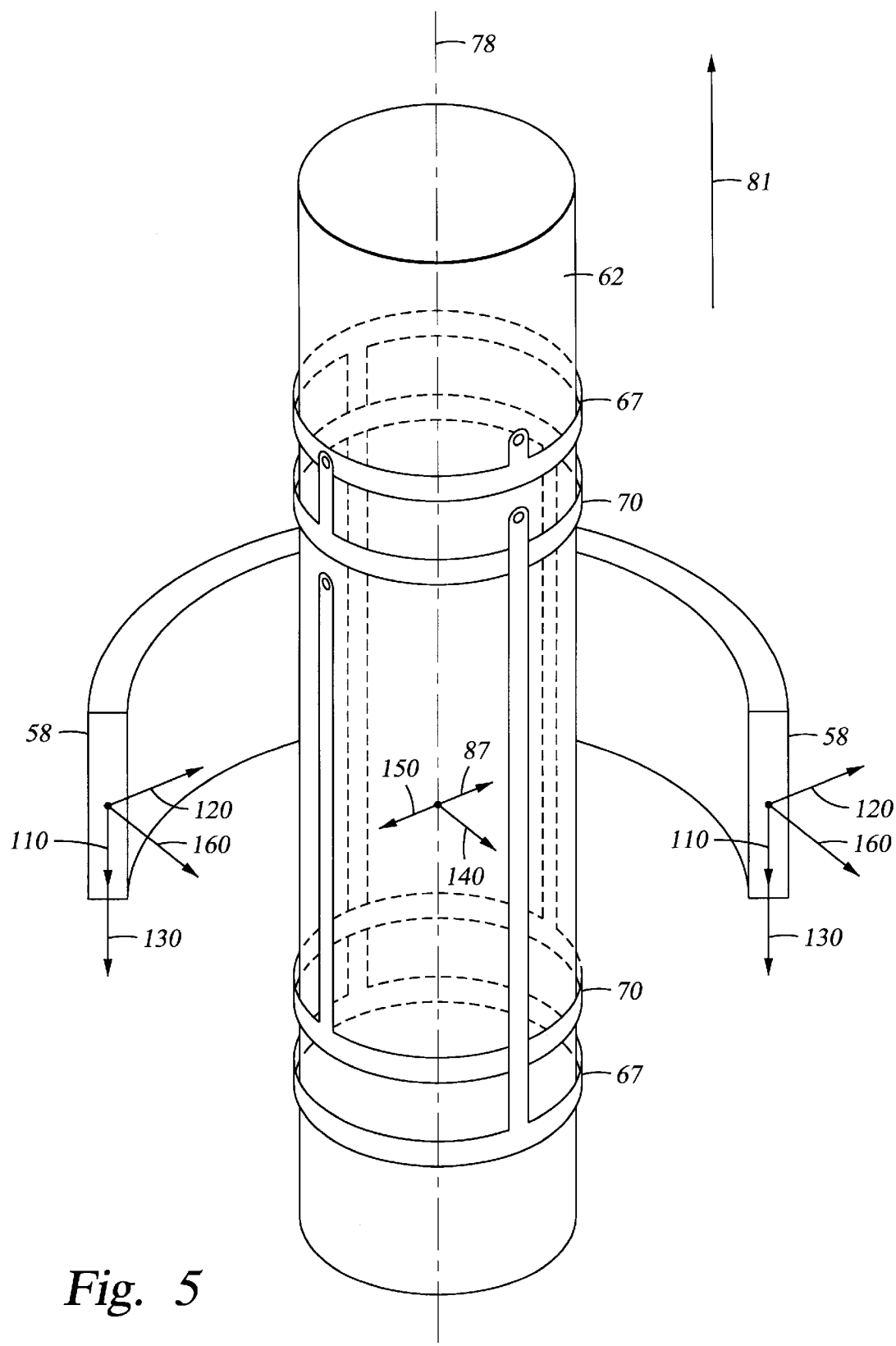
FIG. 5 shows a the magnet dimensions.

The top insert magnet 63 and the bottom insert 64 have magnetization directions parallel to the longitudinal axis 78 and are used in combination with the main magnet 61 for synthesis of the preferred form of a static magnetic field. FIG. 5 shows a drawing including preferred dimensions for the main magnet 61 and insert magnets 63, 64 to generate the preferred static magnetic field. Magnetization directions of the main magnet 61, the top insert magnet 63 and the bottom insert 64 are indicated by arrows in FIG. 5. These particular magnet dimensions are a matter of convenience for the system designer and are not to be construed as a limitation on the invention. The essential features of the static magnetic field achieved by the foregoing dimensions will be further explained in detail.

Figure 6A:
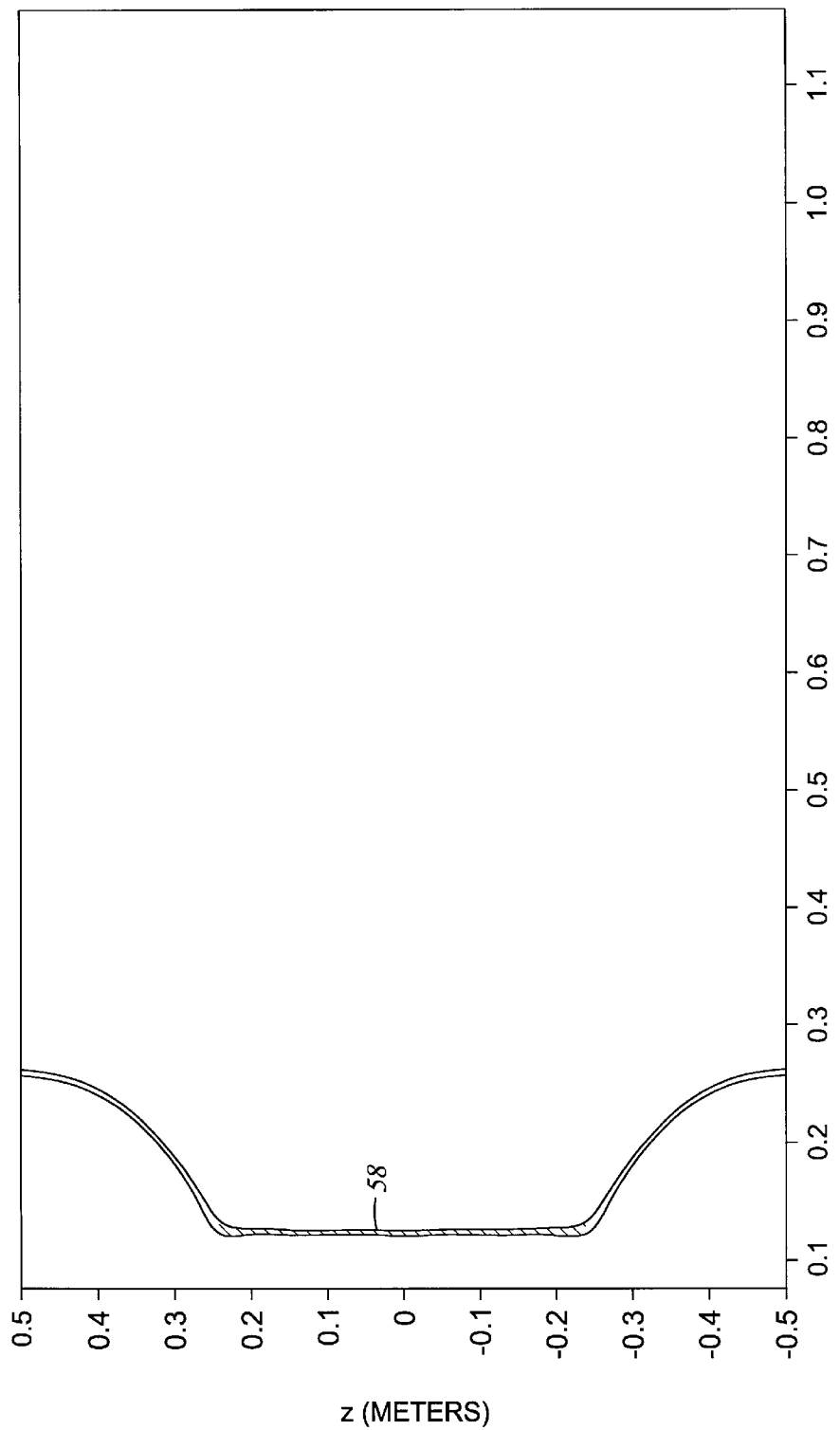
FIG. 6 shows a graphic representation of the static magnetic field induced by the magnet within the sensitive volume.
Figure 6B:
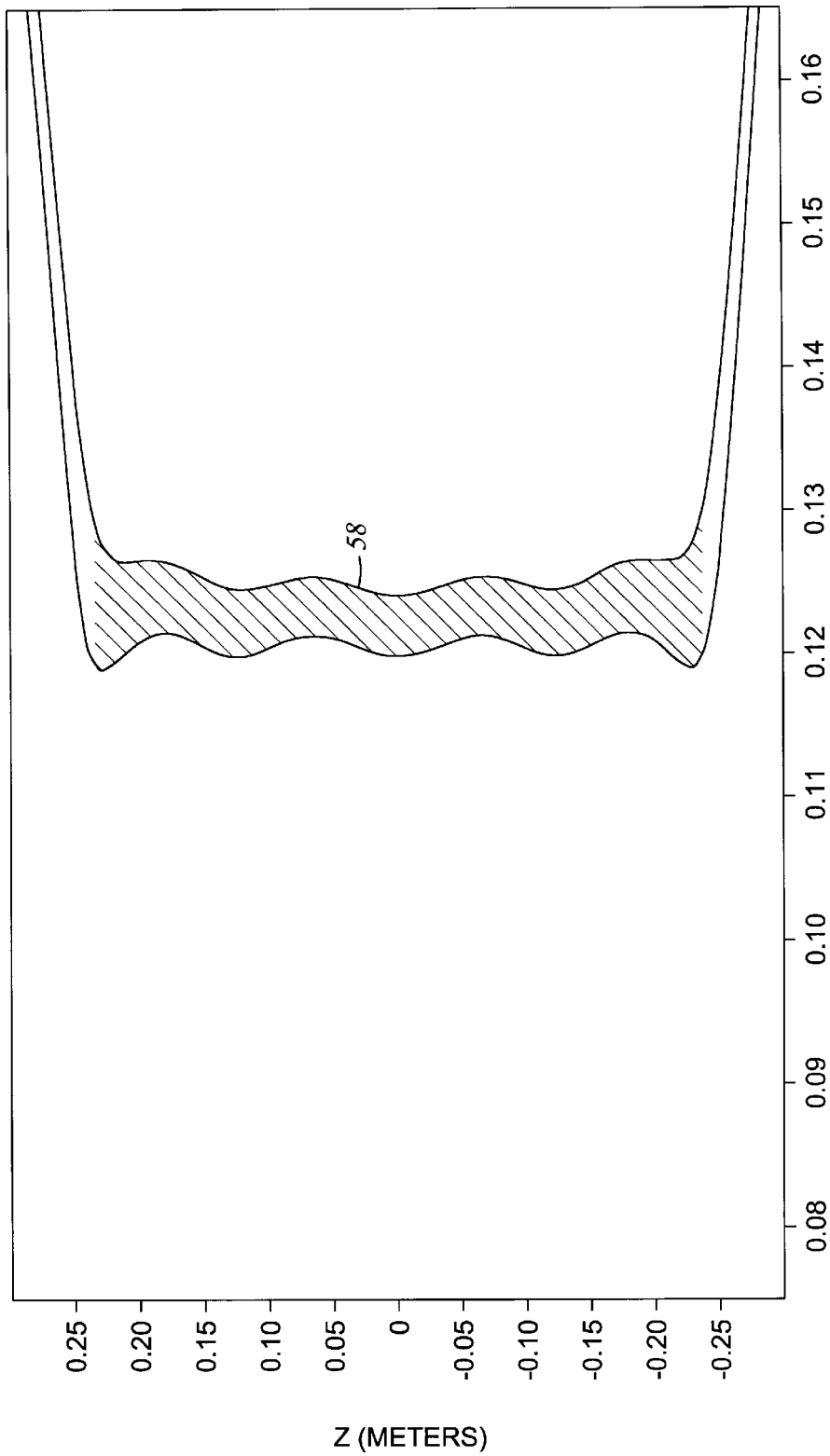

Referring now to FIG. 6, the resulting static magnetic field generated by the magnet 62 in the sensitive region 58 is directed substantially radially outward from the longitudinal axis 78. The static magnetic field generated by the magnet 62 is also substantially symmetric about the longitudinal axis 78, is substantially perpendicular to the longitudinal axis 78, and at radial distances less than the axial length of the magnet 62, decreases in amplitude only as the inverse of the radial distance from the magnet 62.

The permanent magnet material of the permanent magnet 62 should be substantially radio frequency transparent, so that an antenna used to generate a radio frequency magnetic field can be located inside the hole 83 in the main magnet 61, as will be further explained. One type of the radio frequency ("RF") transparent magnet can be made from a ferrite magnet material such as that sold under the trade name "Spinalor" and manufactured by Ugimag, 405 Elm St., Valparaiso, Ind., or another ferrite magnet material sold under the trade name "Permadure" and manufactured by Philips, 230 Duffy Ave., Nicksville, N.Y. These materials are only provided as examples and are not intended to limit the choice of materials for the magnet 62. The magnet 62 only need be substantially transparent to the RF magnetic field at the frequency selected.

Referring once again to FIG. 2, the NMR probe 42 further includes a transceiver antenna 67, which can comprise one or more coil windings 66 preferably arranged inside the hole 83 in the main magnet 61. The coil windings 66 are preferably arranged so that each coil winding lies in a plane substantially perpendicular to the longitudinal axis 78. Radio frequency alternating current passing through the coil windings 66 generates an RF magnetic field in the earth formation (26 in FIG. 1). The RF magnetic field generated by the current flow in the coil windings 66 has field directions substantially parallel to the longitudinal axis 78 within the sensitive volume 58.

The coil windings 66 should have an overall length along the longitudinal axis 78 which is about equal to the diameter of the sensitive volume 58. The overall length of the coil windings 66 parallel to the longitudinal axis 78 should also be substantially shorter than the overall length of the permanent magnet 62 along the longitudinal axis 78, as will be further explained.

Preferably, the coil windings 66 are formed around a soft ferrite rod 68. The soft ferrite rod 68 can be formed from a material such as one sold under trade designation "F6" and manufactured by MMG-North America, 126 Pennsylvania Ave., Paterson, N.J., or another material sold under trade designation "3C2" and manufactured by Philips, 230 Duffy Ave., Nicksville, N.Y. The ferrite rod 68 preferably is positioned parallel to the longitudinal axis 78. The overall length of the ferrite rod 68 along the longitudinal axis 78 should be substantially less than the length of the permanent magnet 62 along the longitudinal axis 78. Alternatively, a plurality of coils and a plurality of ferrite rods may be employed. The assembly of coil windings 66 and soft ferrite rod 68 will be referred to hereinafter as the transceiver antenna 67. The ferrite rod 68 has the particular function of increasing the field strength of the RF magnetic field generated by the transceiver antenna 67. Using the ferrite rod 68 particularly enables the transceiver antenna 67 to have a relatively small external diameter so that it can be located within the hole 83. Having a small external diameter particularly enables the transceiver antenna 67 of the invention to be sized so that the apparatus of the present invention can be used in smaller diameter wellbores.

The permanent magnet 62, the transceiver antenna 67 and the receiver antenna 70 are preferably housed within an RF transparent, non-ferromagnetic protective housing 43. Such housings and additional components (not shown) for excluding the drilling mud under high hydrostatic pressure, are familiar to those skilled in the art.

2. Functional Block Diagram of the NMR Logging Apparatus

Figure 3A:
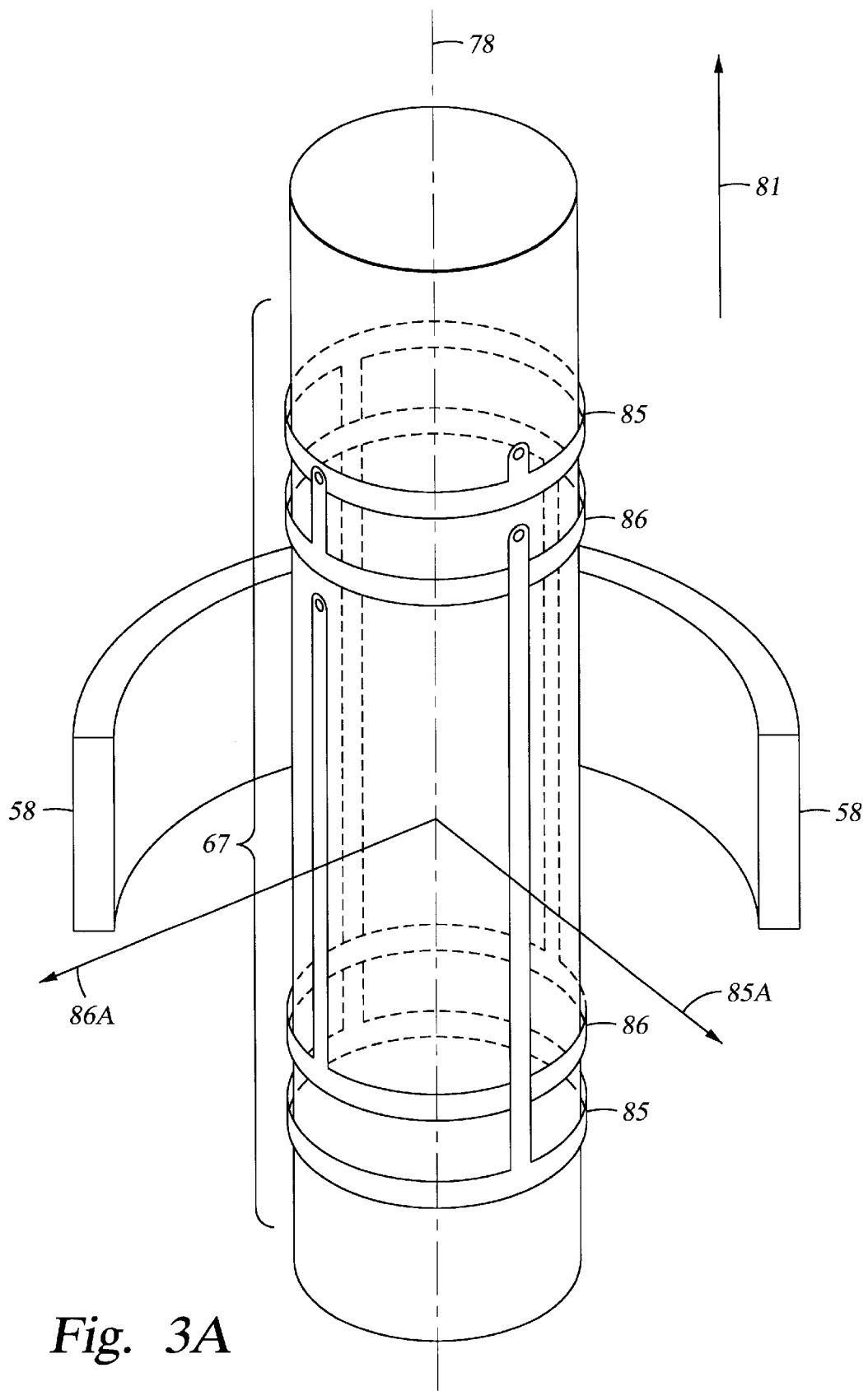
FIG. 3 shows a functional block diagram of the NMR apparatus of the present invention.
Figure 3B:
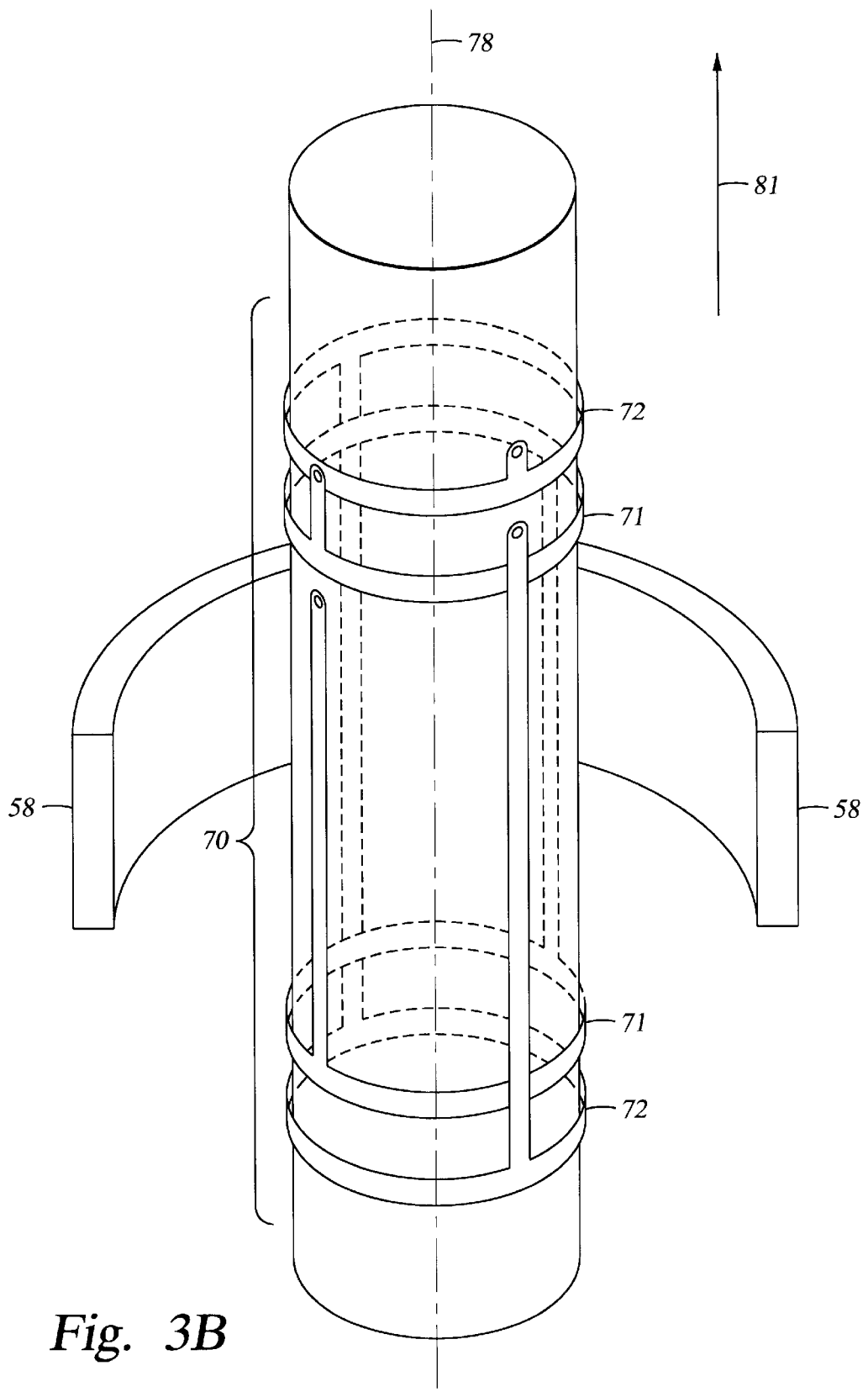

FIG. 3 shows, in general form, the NMR probe 42 and a functional block diagram of the NMR well logging apparatus. A transmitter/receiver (T/R) matching circuit 45 can be disposed within the housing 43. The TIR matching circuit 45 typically includes a series of resonance capacitors (not shown separately), a transmitter/receiver switch (not shown separately) and both "to-transmitter" and "to-receiver" matching circuitry. The T/R matching circuit 45 can be coupled both to a radio frequency (RF) power amplifier 74 and to a receiver preamplifier 73. While shown as located inside the housing 43 the T/R matching circuit 45, the RF power amplifier 74 and the receiver preamplifier 73 alternatively may be located outside the housing 43 within the top centralizer (56 in FIG. 1) or within the NMR electronics cartridge (44 in FIG. 1). The locations of the TIR matching circuit 45, the RF power amplifier 74 and the receiver preamplifier 73 are not to be construed as a limitation on the invention.

Part of the control circuitry for the NMR logging apparatus includes a down-hole computer 92, which among other functions provides control signals to a pulse programmer 91. The computer 92 and the pulse programmer 91 may also be located within the top centralizer 56 or in the NMR electronics cartridge 44. The pulse programmer 91 controls the timing and operation of the variable frequency RF signal source 93. The RF driver 94 receives an input from the variable frequency RF source 93 and provides an output to the RF power amplifier 74. The RF power amplifier 74 provides a high power signal to drive the transceiver antenna 67 for generating an RF magnetic field in the sensitive volume (58 in FIG. 1). The RF power amplifier 74 can be electrically connected (typically by the switch in the T/R matching circuit 45) to the transceiver antenna 67 during transmission of RF power pulses.

During reception of NMR signals, the transceiver antenna 67 can be electrically connected to the receiver preamplifier 73 by means of the switch in the T/R matching circuit 45. The output of the RF receiver preamplifier 73 is provided to an RF receiver 89. The RF receiver 89 also receives a phase reference input from a phase shifter 98. The phase shifter 98 receives a primary phase reference input from the variable frequency RF source 93. The RF receiver 89 may include quadrature detection. The RF receiver 89 provides an output to an A/D converter 96. The A/D converter 96 output can be stored in a buffer 97 until required for use by the down-hole computer 92. Alternatively, the buffer 97 contents can be conducted directly to a downhole part of the telemetry unit 99 for transmission to the surface equipment (54 in FIG. 1).

The downhole computer 92 typically preprocesses the data from the buffer 97 and transfers the preprocessed data to the downhole portion of the telemetry system, shown generally at 99. The downhole portion of the telemetry system 99 transmits the preprocessed data to the telemetry unit (38 in FIG. 1) in the surface equipment (54 in FIG. 1). The telemetry unit 38 transfers the data to the surface computer (40 in FIG. 1) for calculating and presenting desired well logging output data for further use and analysis as is understood by those skilled in the art.

All of the elements described herein, except the transceiver antenna 67 and the magnet assembly 60, can at the convenience of the system designer be disposed within the housing 43, the top centralizer (56 in FIG. 1) or the NMR electronics cartridge (44 in FIG. 1). These same elements may alternatively be located at the earth's surface, for example in the surface equipment 54 using the cable (30 in FIG. 1) for transmission of electrical power and signals to the transceiver antenna 67.

FIG. 3 also illustrates the static magnetic field and the RF magnetic field created by the NMR well logging apparatus of the present invention. The direction of magnetization of the magnet 62 is preferably parallel to the longitudinal axis 78. The direction of the static magnetic field within the sensitive volume 58 generated by the permanent magnet 62 is substantially perpendicular to the longitudinal axis 78 as shown by arrows 110. Nuclear magnetic moments in the material to be analyzed (the earth formation located within the sensitive volume 58) are substantially aligned in the direction of the static magnetic field. In the preferred embodiment of the invention, the direction of a linearly polarized RF magnetic field, denoted by arrows 120, within the sensitive volume 58 is substantially perpendicular to the static magnetic field at any point within the sensitive volume 58. Such a magnetic field arrangement is conventional for NMR experiments.

The static magnetic field direction is symmetrical about the longitudinal axis 78, the static magnetic field magnitude is, therefore, also symmetric in amplitude about the longitudinal axis 78. The static magnetic field has an amplitude gradient within the sensitive volume 58 which is also symmetrical about the longitudinal axis 78 and is directed substantially radially inwardly towards the longitudinal axis 78. As a result of these features of the static magnetic field there is generally only one substantially cylindrical surface external to the permanent magnet 62 which has a particular static magnetic field amplitude (ignoring end effects of the magnet 62). It follows from this particular feature of the static magnetic field that stray resonance signals from diverse materials such as the drilling mud (34 in FIG. 1), which originate outside of the sensitive volume 58 do not seriously affect the NMR measurements if appropriate RF frequencies are selected.

Undesired static magnetic field end effects may be substantially eliminated by making the transceiver antenna 67 somewhat shorter along the longitudinal axis 78 than the permanent magnet 62, so as not to excite materials at the extreme longitudinal ends of the static magnetic field.

When RF power pulses are conducted through the transceiver antenna 67, the antenna 67 generates an RF equivalent magnetic dipole 87 directed parallel to the longitudinal axis 78. The equivalent magnetic dipole 87 generates a linearly polarized RF magnetic field 120 of substantially equal magnitude within the sensitive volume 58. Since the RF magnetic field direction is parallel to the longitudinal axis 78, the bulk nuclear magnetization, denoted in FIG. 3 by arrows 130, at any point in the sensitive volume 58 rotates in planes perpendicular to the longitudinal axis 78. The free precession of the nuclear magnetic moments, however, is around the static magnetic field direction at any point within the sensitive volume 58, and the free precession is always in planes parallel to the longitudinal axis 78. The free precession will therefore induce an RF signal in the transceiver antenna 67. The induced magnetic moment in the transceiver antenna 67 is shown in FIG. 3 as arrows 140.

3. Design Parameters for the Preferred Embodiment

In the preferred embodiment of the invention, the signal-to-noise ratio for the NMR measuring process is sought to be optimized. The following discussion is intended to explain how certain principal parameters affect the signal-to-noise ratio. The principal parameters typically include the geometry of the permanent magnet (62 in FIG. 2) and the transceiver antenna (67 in FIG. 2), the power of radio frequency pulses used to energize the transceiver antenna 67 and the quality factor of the transceiver antenna 67.

Using the transceiver antenna 67 constructed as previously described in the present embodiment of the invention, the magnitude of an NMR signal, S, induced in the transceiver antenna 67 is typically related to the magnitude of an RF electromagnetic field, $B_1$, by the Reciprocity Theorem and can be described as in the following expression:

$$S = \omega m \, A_{sv} (B_1/I_1) l \qquad (1)$$

where m and $A_{sv}$, respectively, represent the nuclear magnetization and the cross sectional area of the sensitive volume (58 in FIG. 1), $I_1$ represents the magnitude of the current flowing in the transceiver antenna 67, the oscillating frequency of the current is represented by $\omega$ and l represents the effective length of the transceiver antenna 67. For simplicity of the discussion, m and $B_1$ are assumed to be substantially homogeneous within the sensitive volume 58.

By substituting $m = \chi B_0/\mu_0$; where c represents the nuclear magnetic susceptibility of hydrogen nuclei within the sensitive volume 58, $\omega = \gamma B_0$, where $B_0$ represents the static magnetic field generated by the permanent magnet (62 in FIG. 2) and described in equation (1), it is therefore possible to derive the following expression for S:

$$S = (\gamma \chi/\mu_0) B_0^2 (B_1/I_1) A_{sv} l \qquad (2)$$

The NMR signal thus acquired is therefore directly proportional to the sensitive volume 58 in the earth formation (26 in FIG. 1). The geometry of the sensitive volume 58 is determined by the existence of a resonance condition. In pulsed NMR, the resonance condition is typically met when the deviation of the static magnetic field magnitude $B_0(R)$ from its value $B_0(R_{sv})$, corresponding to the central frequency of the current energizing the transceiver antenna 67 ($B_0(R) = \omega/\gamma$), is no greater then half the magnitude of the RF magnetic field $B_1$ induced by passing current through the transceiver antenna 67, expressed as shown in equation (3):

$$B_0(R) - B_0(R_{sv}) < B_1/2 \qquad (3)$$

The static magnetic field $B_0(R)$ at the excitation radius $R_{sv}$ may also be described in the form of a Taylor expansion as:

$$B_0(R) = B_0(R_{sv}) - (\partial B_0/\partial R)(R - R_{sv}) \qquad (4)$$

where $(\partial B_0/\partial R)$ represents the static magnetic field gradient at radius $R = R_{sv}$. From equation (3):

$$B_0(R_o) - B_0(R_i) < B_1 \qquad (5)$$

where $R_o$ and $R_i$ represent, respectively, the outer and inner radii of the sensitive volume 58. As a practical matter $R_o - R_i << R_{exc}$.

$$A_{sv} = 2\pi R_{sv} B_1/(\partial B_0/\partial R) \qquad (6)$$

Substitution of the equation (6) into (2) yields:

$$S = 2\pi(\gamma \chi/\mu_0) B_1 (B_1/I_1) R_{sv} l B_0^2/(\partial B_0/\partial R) \qquad (7)$$

As is understood by those skilled in the art, the root-mean-square (RMS) thermal noise can be described by the expression:

$$N_{rms} = (4kT \, \Delta f r)^{1/2} \qquad (8)$$

where $\Delta f$ represents the receiver bandwidth. The bandwidth is typically about $\gamma B_1/2\pi$ for a matched receiver; k represents Boltzmann's constant; and T represents the absolute temperature.

Then for S/N we have:

$$S/N = [2\pi(\gamma\chi/\mu_0) B_1 (B_1/I_1) R_{sv} (kT\Delta f r)^{-\frac{1}{2}}] \times [l B_0^2/(\partial B_0/\partial R)] \qquad (9)$$

The first bracketed expression in equation (9), for a given proton spin density and absolute temperature, depends only on the transceiver antenna 67 parameters. The second bracketed expression in equation (9) describes parameters used in the design of the permanent magnet (62 in FIG. 2), as will be firther explained.

Another parameter affecting the design of the permanent magnet is the degree of the static field homogeneity in the direction of NMR tool motion as will be further explained.

4. Synthesis of the Static Magnetic Field

It follows from (10) that given the antenna aperture length l and the radius $R_{sv}$ of the sensitive volume are determined by the vertical resolution and penetration depth requirements, the ratio $B_0^2/(\partial B_0/\partial R)$ should be maximized to provide maximum signal-to-noise ratio. For the elongated magnet with homogeneous distributed magnetic charge (linear distribution of magnetization within the main magnet 61 in FIG. 4) $B_0$ can be calculated as:

$$B_0 = q/2\pi R \qquad (10)$$

where q is the magnetic charge per unit length of the magnet. By the definition the magnetic charge density is given by the equation $\rho = -\mu_0 \text{div} M$. Therefore, in our case we have:

$$q = \rho \pi R_m^2 = (2 B_{rm}/l_m) \pi R_m^2 \qquad (11)$$

where $R_m$ is the magnet radius; $B_{rm}$ is the maximum remanence of the magnet material used.

Substitution (11) to (10) and then $B_0$ and $(\partial B_0/\partial R)$ to (9) gives for the permanent magnet related part of the S/N as follows:

$$S/N \, B_{rm} R_m^2 l/l_m \qquad (12)$$

It is clear from (12) that for any value of vertical resolution selected for the instrument, the S/N is inversely proportional to $l_m$. To keep the length $l_m$ of the magnet 62 as short as is practical, it is important for the static magnetic field to be substantially perpendicular and homogeneous for as great a fractional amount as possible of the axial length of the magnet 62. The length of the perpendicular, homogeneous static magnetic field should also exceed the antenna aperture length l to ensure a steady state nuclear magnetization measurement even while the NMR probe 42 is moving through the wellbore (22 in FIG. 1). In addition to these requirements, the static magnetic field should be minimized in the region where the transceiver antenna 67 is placed. A preferred embodiment of the permanent magnet (62 in FIG. 2) is shown in FIG. 5. The main magnet 61 is made of up of annular magnetic rings 61A–61F each having a different residual magnetization so as to approximate substantially linear magnetization distribution from one end of the magnet 61 to the other. Additionally, the top insert magnet 63 and the bottom insert magnet 64 serve to optimize the static field according to the criteria stated above, namely, a high degree of static field homogeneity in the direction of longitudinal axis 78 for performing NMR measurements while moving along the wellbore (22 in FIG. 1), and a low residual static magnetic field at the transceiver antenna 67 so the ferrite rod 68 will remain substantially unsaturated.

Figure 7:
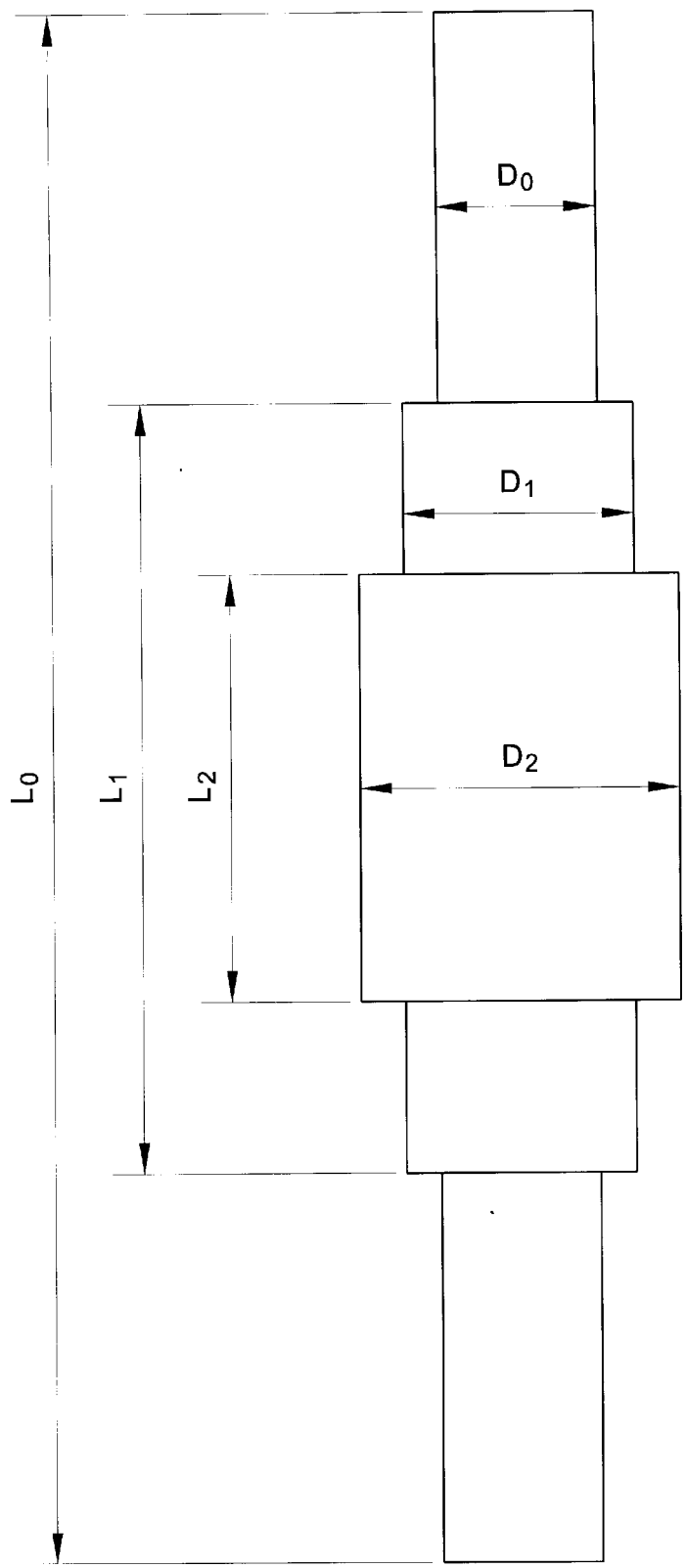
FIG. 7 shows a graph of the longitudinal component of the static magnetic field induced by the magnet within the transceiver antenna, both with and without end-magnet inserts.

FIG. 6 shows a graphic representation of the static magnetic field within the volume of investigation (58 in FIG. 2). FIG. 7 shows the residual longitudinal magnetic field within the hole (83 in FIG. 2) at the location of the transceiver antenna 67.

The dimensions shown for the magnet 62 in FIG. 5 are as follows: $L_0$=1.2 m; $L_h$=0.64 m; $D_0$=0.07 m; $D_h$=0.03 m. The magnet presented in FIG. 5 is especially suitable for a 30 cm length transceiver antenna 67 and a 24 cm diameter sensitive volume (58 in FIG. 2). The main magnet 61 should be transparent to the RF magnetic field emitted by the transceiver antenna 67. Since the main magnet 61 need only have relatively low remanence magnetization this part of the magnet 62 can be formed from ferrite permanent magnet material or the like which is substantially nonconductive and radio frequency transparent. The end magnets 63, 64 preferably are made from a high remanence magnetization material such as sintered oriented Samarium-Cobalt or Neodymium-Iron-Boron having a remanence magnetization of 1 T or more. The magnetic field shown in FIG. 6 assumes the end magnets have a remanence magnetization of 0.7 T for the end magnets 63, 64 and 0.42 T for the main magnet 61.

Figure 8:
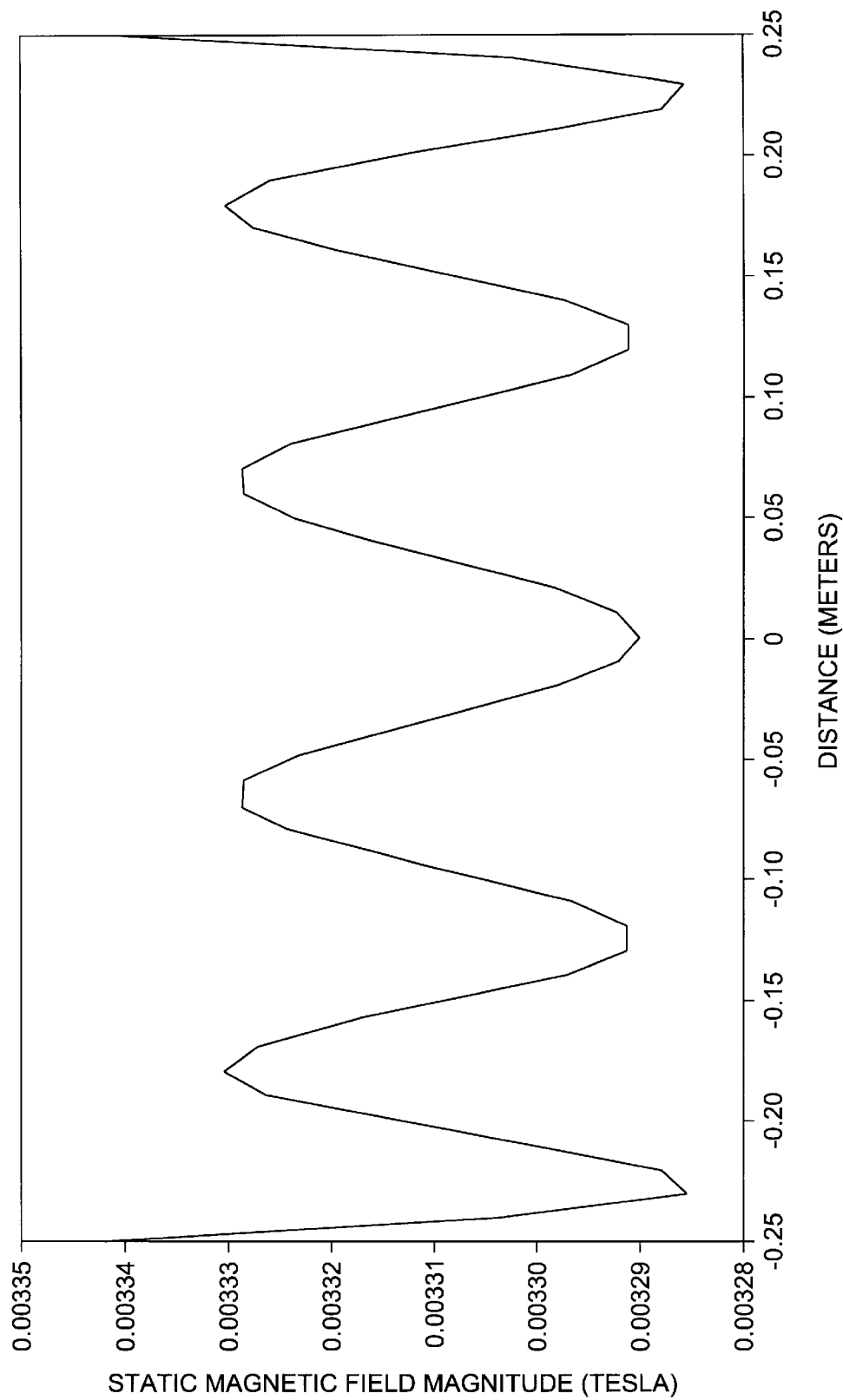
FIG. 8 shows the static magnetic field of FIG. 6 in more detail.

The static magnetic field within the sensitive volume 58 has substantially equal amplitude for NMR excitation. As was explained for equation (3), within the sensitive volume 58 the static magnetic field amplitude varies only within a narrow range from $B_0-B_1/2$ to $B_0+B_1/2$. It is of great importance how fast the spatial variation of this field is in a direction of motion of the logging instrument. The rate of this variation corresponds to the static magnetic field amplitude gradient in the direction of motion. The static magnetic field amplitude gradient distribution inside the sensitive volume 58 is explained schematically in FIG. 8. Two lines 58L and 58M represent lines of equal magnitude of the static magnetic field, with a first magnitude and a second magnitude, respectively. These magnitudes are in the range from $B_0-B_1/2$ to $B_0+B_1/2$. Static magnetic field magnitude gradients at location 58A and location 58D in FIG. 8 are inversely proportional to a distance between two points along a direction of movement 81 parallel to the longitudinal axis 78, one on line 58L and other on line 58M. For example, the gradient component in the direction 81 at location 58A in the central part of the sensitive volume 58 is inversely proportional to the distance between points 58A and 58C. The gradient component in the direction 81 at location 58D in the top end of the sensitive volume 58 is inversely proportional to the distance between points 58E and 58D. It should be apparent from FIG. 8 that the gradient at the central part of the sensitive volume 58 is much smaller than the gradient at its ends. The gradient component in the direction perpendicular to the longitudinal axis 78 at location 58A in the center part of the sensitive volume 58 is inversely proportional to the distance between points 58B and 58A. The strongest component of the static magnetic field amplitude gradient is in the radial direction.

The sensitive volume 58 is determined by the RF magnetic field. To obtain undistorted NMR signals, any point within the sensitive volume should not leave the sensitive volume during the time span of a measurement sequence (a full CPMG echo train). If tool motion is such that any point may leave the sensitive volume during a measurement sequence, subsequent 180° rephasing pulses in a Carr-Purcell ("CPMG") echo train may be applied to parts of the earth formation which had not previously been transversely polarized by the initial 90° pulse. The distance, $\Delta s$, along a direction of motion from a point, N, inside the sensitive volume 58 to the boundary of the sensitive volume 58 can be estimated by the expression:

$$\Delta s(N)=[B_0(n)-B_0(B)]/G \quad (13)$$

where $B_0(N)$ represents the static magnetic field amplitude at point N inside the sensitive volume 58, $B_0(B)$ represents the static magnetic field amplitude at the boundary of the sensitive volume 58 and G represents the static magnetic field gradient in the direction of motion. The total movement, or displacement during a time interval, t, of the well logging instrument should be less than $\Delta S(N)$. More specifically:

$$v \times t < \Delta s(N) \quad (14)$$

where v represents the speed of motion of the well logging instrument. The total displacement of the instrument should not represent a substantial portion of the total volume. The inequality which should thus be satisfied can be written as:

$$[B_0(N)-B_0(B)] < < B_1 \quad (15)$$

A reasonable estimate of the maximum gradient in the direction of motion can be calculated as:

$$G < (0.1B_1)/(v \times t) \quad (14)$$

For practical values of $B_1$ in the range of $2 \times 10^{-4}$ T, and v of about 0.05 m/sec, for a time of 200 milliseconds for a measurement sequence G should be less than about $2 \times 10^{-3}$ T/m (equivalent to about 0.2 Gauss/cm). This value was used as a constraint in the procedure for optimizing the shape of the static magnetic field.

It is common for a logging instrument velocity perpendicular to the wellbore to be about 50 times smaller than the logging speed. This requires the static magnetic field gradient in the direction perpendicular to the longitudinal axis 78 to be less than about 0.1 T/m. The preferable geometry of the magnet shown in FIG. 5 has a radial static magnetic field gradient of 0.05 T/m (5 Gauss/cm). Other values of the radial amplitude gradient may be selected, depending on the NMR excitation frequency selected.

The requirements for the radial static magnetic field gradient are also affected by the presence of earth magnetic field $H_e$. Earth's magnetic field is substantially homogeneous and is about $0.5 \times 10^{-4}$ T in magnitude. The logging tool orientation with respect to the earth's magnetic field direction depends on the wellbore geographical location and drilling deviation. This field variation should not substantially change the radius $R_{sv}$ of the sensitive volume (58 in FIG. 1). The magnitude of any such change in $R_{sv}$ may be expressed as the ratio $H_e/G$. Therefore, the required radial static magnetic field magnitude gradient G should satisfy the inequality $H_e/G < < R_{sv}$; or $G > > H_e/R_{sv}$. For $R_{sv}$=0.1 m G should be much greater than about $5 \times 10^{-4}$ T/m. As a practical matter the radial gradient ($2 \times 10^{-2}$ T/m) of the magnet shown in FIG. 6 more than meets this requirement.

It will be readily appreciated by persons skilled in the art that the invention is not limited to what has been particularly shown and described herein. Rather the scope of the present invention should be limited only by the claims which follow.

What is claimed is:

1. A nuclear magnetic resonance sensing apparatus, comprising:

a magnet for inducing a static magnetic field within materials to be analyzed, said magnetic field polarized substantially perpendicularly to a longitudinal axis of said magnet and substantially symmetric about said longitudinal axis, said magnetic field having a maximum longitudinal gradient inversely related to a speed of motion of said apparatus along said longitudinal axis through said materials to be analyzed;

a transmitter for generating a radio frequency magnetic field in said materials for exciting nuclei therein, said radio frequency magnetic field substantially orthogonal to said static magnetic field; and a receiver for detecting nuclear magnetic resonance signals from said excited nuclei in said materials.

2. The apparatus as defined in claim 1 wherein said longitudinal gradient is less than about $2 \times 10^{-3}$ T/m corresponding to a speed of motion of about 10 feet per minute.

3. The apparatus as defined in claim 1 wherein said static magnetic field comprises a radial gradient inversely related to an expected velocity of radial movement of said apparatus through said materials.

4. The apparatus as defined in claim 3 wherein said radial gradient is less than about 0.1 T/m.

5. The apparatus as defined in claim 4 wherein said radial gradient is more than about $2 \times 10^{-2}$ T/m to minimize effects of the earth's magnetic field on measurements made by said apparatus.

6. The apparatus as defined in claim 1 wherein said transmitter comprises an antenna having a longitudinal aperture shorter than a length of said magnet along said direction of motion of said apparatus, whereby nuclei are excited by said radio frequency magnetic field where said nuclei are substantially in equilibrium with said static magnetic field.

7. The apparatus as defined in claim 1 wherein said static magnetic field is substantially parallel to said longitudinal axis for a maximum fraction of a length of said magnet along said longitudinal axis.

8. The apparatus as defined in claim 7 wherein said magnet comprises:

magnetized cylinders stacked along said longitudinal axis, a magnetization of each of said cylinders proportional to its distance from a center plane of said magnet, said cylinders magnetized parallel to said longitudinal axis and towards said center plane; and an end magnet disposed at each longitudinal end of said stacked cylinders, said end magnets each magnetized parallel to said longitudinal axis and in a direction opposite to said magnetization of an adjacent one of said cylinders, whereby said static magnetic field includes said maximum longitudinal gradient and said static magnetic field is substantially parallel to said longitudinal axis for said maximum fraction of said length of said magnet.

9. The apparatus as defined in claim 8 wherein said cylinders comprise annular rings, thereby creating a central void space within said magnet, and wherein at least one of said transmitter and said receiver comprises an antenna disposed in said void space.

10. A method for measuring nuclear magnetic resonance properties of earth formations penetrated by a wellbore, comprising:

polarizing nuclei in said earth formations along a static magnetic field substantially perpendicular to and symmetrical about an axis of said wellbore, said static magnetic field having an amplitude gradient parallel to said axis inversely related to a speed of motion of a well logging instrument along said wellbore;

polarizing said nuclei by applying a radio frequency magnetic field substantially orthogonal to said static magnetic field; and receiving nuclear magnetic resonance signals from said transversely polarized nuclei.

11. The method as defined in claim 10 wherein said gradient parallel to said axis is less than about $2 \times 10^{-3}$ T/m corresponding to a speed of motion of about 10 feet per minute.

12. The method as defined in claim 10 wherein said static magnetic field has a radial amplitude gradient inversely related to an expected speed of radial motion of said logging instrument.

13. The method as defined in claim 12 wherein said radial gradient is less than about 0.1 T/m.

14. The method as defined in claim 9 wherein said radial gradient is more than about $2 \times 10^{-2}$ T/m to minimize effects of the earth's magnetic field on measurements of said nuclear magnetic resonance properties.

* * * * *